United States Patent [19]

Liao

[11] Patent Number: 5,524,850

[45] Date of Patent: Jun. 11, 1996

[54] CARRIER TAPE REEL ASSEMBLY

[75] Inventor: Yi C. Liao, Hsin Chu Hsien, Taiwan

[73] Assignee: Gallant Precision Machining Co., Ltd., Taipei Hsien, Taiwan

[21] Appl. No.: 317,694

[22] Filed: Oct. 5, 1994

[51] Int. Cl.[6] .................. B65H 75/14; B65H 75/18
[52] U.S. Cl. ................. 242/608.600; 242/608.500; 242/609.300
[58] Field of Search ............... 242/609.3, 609.1, 242/608.5, 608.6, 118.6, 118.61

[56] References Cited

U.S. PATENT DOCUMENTS

| | | | |
|---|---|---|---|
| 2,494,612 | 1/1950 | Goldberg et al. | 242/609.3 |
| 2,605,057 | 7/1952 | Faulkner et al. | 242/609.3 |
| 3,063,652 | 11/1962 | Bell | 242/609.1 X |
| 4,128,215 | 12/1978 | Underwood | 242/608.6 |
| 4,226,381 | 10/1980 | Katata | 242/608.6 |
| 4,234,137 | 11/1980 | Watanabe et al. | 242/608.6 X |
| 4,726,534 | 2/1988 | Chenoweth | 242/609.3 |
| 5,114,089 | 5/1992 | Posso | 242/608.6 |

Primary Examiner—John Q. Nguyen
Attorney, Agent, or Firm—Fish & Richardson

[57] ABSTRACT

A reel section having hooks is provided. The reel section includes a hub and a side member which attaches to the hub. The hub has circumferential wall projected laterally from the side member, and a base wall joined to the circumferential wall. The base wall has a plurality of hooks extended in a circumferential direction and each base wall has a slot located about each hook. Each hook has a generally flat first section, a second section joined to the first section and a hook end projected from the second section. The second section projects laterally from the plane of the first section. The hook is adapted to cooperate with the hook of another reel section to form a reel assembly.

1 Claim, 3 Drawing Sheets

5,524,850

CARRIER TAPE REEL ASSEMBLY

FIELD OF INVENTION

The invention relates to a carrier tape structure for storing a ribbon of flexible sheet material such as tape and the like.

BACKGROUND OF THE INVENTION

A carrier tape and reel system is typically used to store semiconductor devices. As shown in FIG. 1, the semiconductor devices 11 are held in line on a carrier tape 12 wound around a reel 13 through an adhesive tape 14. One end of the carrier tape is attached to a central hub so that when the carrier reel 13 is rotated, the carrier tape 12 is wound on the reel 13. The reels are made typically from plastic materials with an injection plastic molding process. The molded plastic reel is an integral one piece structure having a central hub and a pair of circular side members. The prior art reels for carrier tapes are assembled at the manufacturing site. The central hubs of adjacent plastic reels are heat sealed together to form a unitary carrier reel 13. Furthermore, a carrier tape reel assembly having reel sections with hubs that are interlocked together is disclosed in U.S. Pat. No. 4,726,534, which is hereinafter referenced for all purposes.

SUMMARY OF INVENTION

The invention relates to a reel assembly having interlocked hubs of reel sections. The reel sections may be nested together to provide a compact structure for storage and shipment.

The reel assembly is made of compatible reel sections that are interlocked together. Each reel section has a circular side wall surrounding a central hub. The hub has a circumferential wall joined to a base wall offset from the plane of the side wall. The base wall has a plurality of hooks. The hooks on adjacent base walls of the pairs of reel sections making up the reel assembly interengage each other and bias the base walls of the adjacent base walls into surface engagement with each other. The locked hooks also prevent the interengaging hooks from disengaging each other.

The features and advantages of the invention are set forth in the following disclosure and drawings.

DESCRIPTION OF PREFERRED EMBODIMENT

Figure 1:
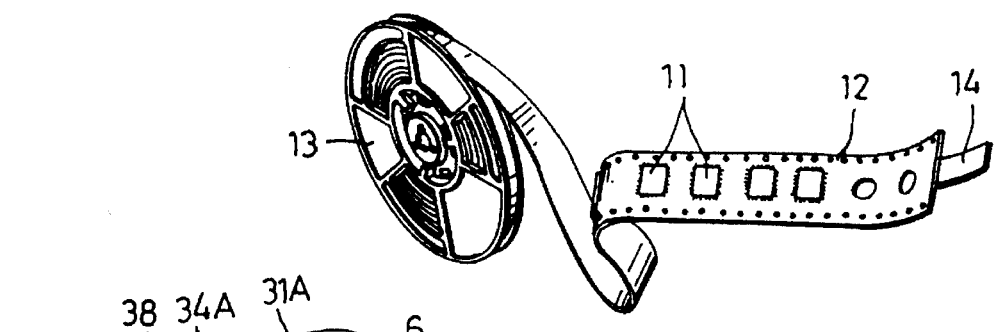
FIG. 1 shows a reel assembly wound by a carrier tape.
Figure 2B:
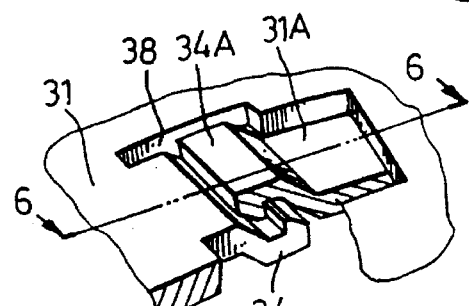
FIG. 2B is a cut-away view of the portion of the interengaged hooks in accordance with the invention.
Figure 2A:
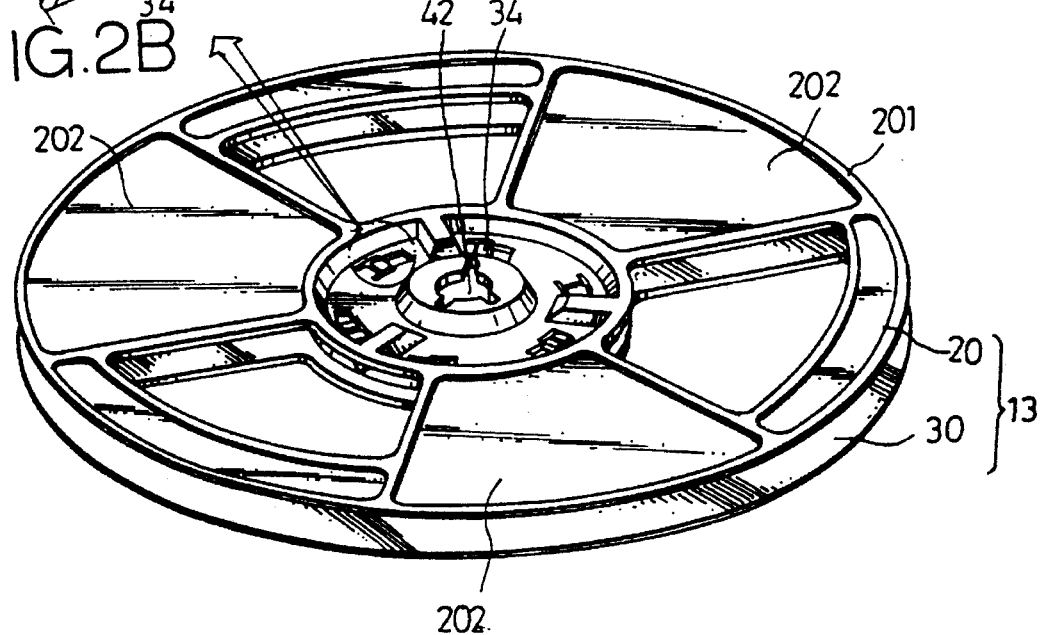
FIG. 2A is a perspective view of the invention.
Figure 3:
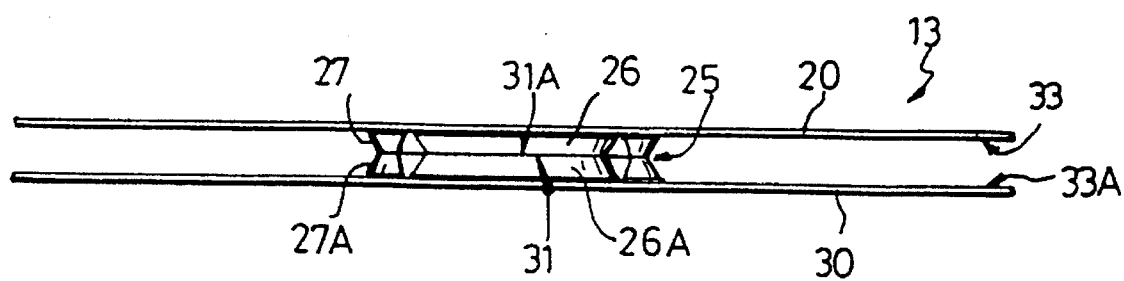
FIG. 3 is a side view of the reel assembly of the invention.
Figure 4:
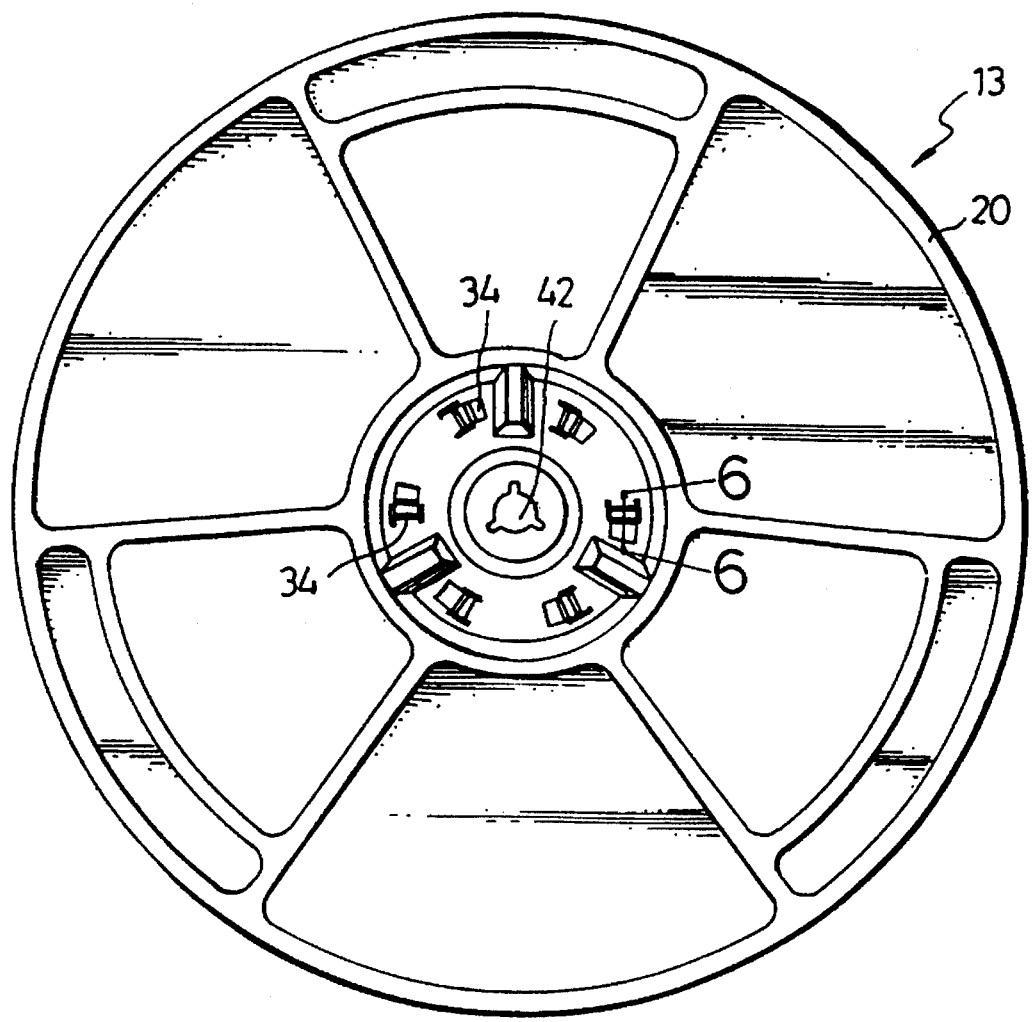
FIG. 4 is a plan view of the reel assembly of the invention.

Referring to FIG. 2 through 4, there is shown the reel assembly of the invention for accommodating flexible sheet material, such as tape. The sheet material may be laminated sheets which enclose objects such as semiconductor devices. The reel assembly 13 has a pair of reel sections 20 and 30 interlocked together with a central cylindrical body 25. Reel section 20 has a circular outer rim 201 joined to radially inwardly-converging spokes 202. Spokes 202 are generally separate segments of a circular plane and are integral with a central cylindrical hub 26. Hub 26 has an outer circumferential wall 27 which forms part of the hub 26 of reel 20.

Hub 26 has a generally flat base wall 31 joined to wall 27. Base wall 31 is generally parallel to side wall 33. The central portion of base wall 31 has a cone-shaped boss, the center of which has an opening 42 with radial recesses to accommodate a shaft or the like. The entire reel section 20 is a one piece plastic member which is injection-formed, among other methods, from sheet plastic. Reel section 30 is identical to reel section 20 and the parts of reel section 30 that correspond with parts of reel section 20 have the same reference numeral with the suffix A.

Hub 26 and 26A have interlocking structures that hold the base walls 31 and 31A of the hub in firm surface engagement with each other and thereby form a complete reel assembly 13. The interlocking structures comprise a circle of interengaging hooks 34. As shown in FIG. 4, the circle of hooks 34 includes six pairs of circumferentially spaced interengaging hooks each of which is identical. Hooks 34 are shown in FIG. 2B as projecting from an edge of a generally rectangular-shaped slot 38 in base wall 31.

Figure 5:
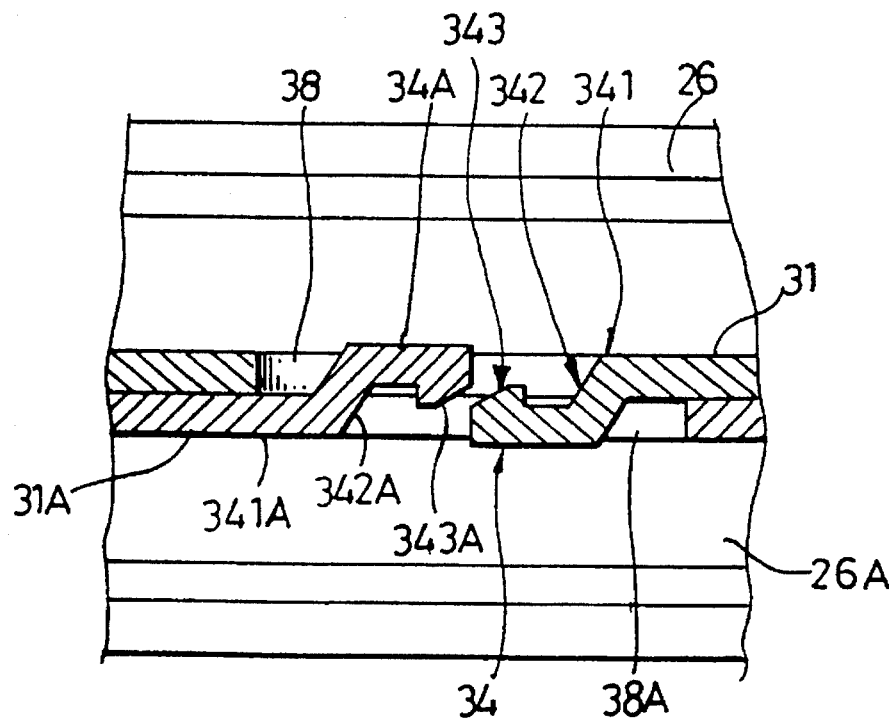
FIG. 5 is an enlarged section view along line 6—6 showing the status of the hooks of adjacent reel sections before engagement.
Figure 6:
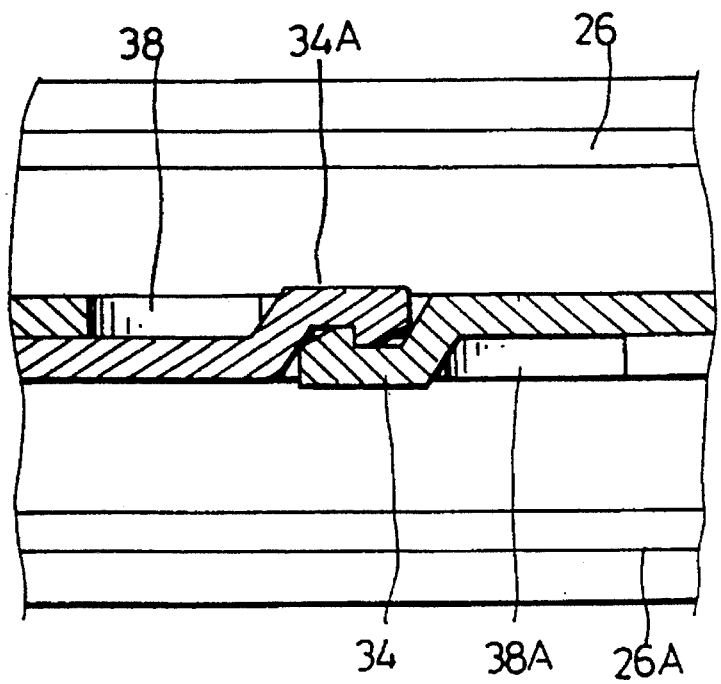
FIG. 6 is an enlarged section view along line 6—6 showing the status of the hooks of adjacent reel sections after engagement.

As shown in FIGS. 5 and 6, hook 34 has a generally flat base section 341 joined to a rectangular arm section 342 along a bend line. The base section 341 is located generally along the same plane as base wall 31 and constitutes one edge of the slot 38. The rectangular arm section 342 projects laterally at an angle of about 45 degrees from the plane of base section 341. Other angles of inclination of arm section 342 may also be used. A hook end 343 projects from the arm section 342 as shown in FIGS. 5 and 6.

As shown in FIG. 6, the dimensions of the rectangular arm section 342, 342A and the hook ends 343, 343A are designed and adapted in such a way that when interengaging hooks 34 engage with each other the base walls 31 and 31A are in surface engagement with each other tightly. The hook ends 343 and 343A of the hooks 34 are biased outwardly in opposite directions and hold base walls 31 and 31A in engagement with each other. The outward flexing of base sections 341 and 341A continuously biases the walls 31 and 31A into surface engagement with each other to form cylindrical body 25. The ramps provided at the end of the hook ends 343 guide the hook ends 343 and 343A into interengaging relationship during the assembly procedure of the reel sections.

Referring to FIG. 2B, hook ends 343 and 343A prevent reverse or backward rotation of reel sections 20 and 30 thereby maintaining the interlocking relation with each other.

Before storing the ribbon material, reel sections 20 and 30 having selected hub sizes are snapped together to form the reel assembly 13 by procedures described as follows. The inclined ramp of each of the adjacent pairs of hook ends 343 and 343A are located adjacent each other as shown in FIG. 5. The reel sections 20 and 30 are then rotated relative to each other until the adjacent hooks 34 and 34A move into interengaging relationship with each other, as shown in FIG. 2B and FIG. 6. The hook ends 343 and 343A are forced into engagement with each other and function as a leaf spring that biases the base walls 31 and 31A into engagement with each other. The hook ends 343 and 343A prevent reverse relative circumferential movement between the reel sections and also prevent relative axial movement between the reel sections.

What is claimed is:

1. A reel assembly comprising:

a first reel section having a first hub and a first side wall, the first hub having a first circumferential wall, said first circumferential wall having a first edge and a second edge, the first side wall having a generally central portion attached to the first hub at said first edge of the first circumferential wall, the first side wall being substantially perpendicular to the first circumferential wall;

a second identical reel section having a second hub and a second side wall, the second hub having a second circumferential wall, said second circumferential wall having first edge and a second edge, the second side wall having a generally central portion attached to the second hub at said first edge of the second circumferential wall, the second side wall being substantially perpendicular to the second circumferential wall;

wherein each of said first and second hubs has a base wall which is joined to the second edge of the respective circumferential wall and is generally parallel to the respective side wall and a plurality of hook means provided on each of said base walls, and distributed along a circumferential direction each of the plurality of hook means of one base wall interlocking with a corresponding hook means provided on the other of said base walls for biasing the base wall of the first reel section against the base wall of the second identical reel section to hold the first and second hubs in engagement with each other, each base wall having a plurality of slots equal to the number of hook means and distributed in the same manner and along the same circumferential direction as the hook means, each hook means having a generally flat first section extending along a plane of the respective base wall, a second section joined to the first section and protecting laterally from the plane of the first section and away from the respective base wall and side wall, and a hook end projecting from the second section, said hook end having a distal end extending back toward the plane of the respective base wall and defining a recess which opens toward the plane of the base wall, said hook ends of the hook means of the first reel section projecting through the slots in the base wall of the second identical reel section and interlocking within the corresponding recesses second identical reel section, said hook ends of the hook means of the second identical reel section projecting through the slots in the base wall of the first reel section and interlocking with the corresponding recesses of first reel section, said hook ends of the hook means of the first and second identical reel sections being located in interlocking engagement with each other for holding the base walls of the first and second identical reel sections together to form the reel assembly and for preventing relative circumferential movement between the first reel section and the second identical reel section.

* * * * *